Feb. 5, 1952 R. M. CROOKER ET AL 2,584,332

VIDEO AMPLIFIER HAVING VARIABLE GAIN AND VARIABLE BAND WIDTH

Filed Aug. 19, 1949 2 SHEETS—SHEET 1

INVENTOR.
Robert M. Crooker
Garth J. Heisig
BY
Foorman L. Mueller
Atty.

VIDEO AMPLIFIER HAVING VARIABLE GAIN AND VARIABLE BAND WIDTH

Filed Aug. 19, 1949 2 SHEETS—SHEET 2

INVENTOR.
Robert M. Crooker
Garth J. Heisig
BY
Foorman L. Mueller
Atty.

Patented Feb. 5, 1952 2,584,332

UNITED STATES PATENT OFFICE 2,584,332

VIDEO AMPLIFIER HAVING VARIABLE GAIN AND VARIABLE BAND WIDTH

Robert M. Crooker and Garth J. Heisig, Chicago, Ill., assignors to Motorola, Inc., Chicago, Ill., a corporation of Illinois Application August 19, 1949, Serial No. 111,306

5 Claims. (Cl. 179—171)

This invention relates to video amplifiers for television receivers, and particularly to an improved manual gain control for a video amplifier to provide effective contrast control for the television receiver.

The contrast between light areas and dark areas in a television picture customarily is controlled by varying the gain of the video amplifier. When weak signals are being received, the contrast control is set for high gain to obtain proper contrast. When strong signals are being received, the contrast control is set for low gain to avoid excessive contrast which tends to distort the picture. Picture quality depends also upon the effective bandwidth of the video amplifier. For weak signals, a relatively narrow bandwidth is preferred. This causes some of the picture details to be sacrificed, but it also omits a great deal of interference which otherwise would obscure the picture when the gain of the receiver is high. For receiving strong signals, when the gain of the receiver need not be so high and there is relatively little interference, a wide video band is preferred in order to bring out all of the fine details of the picture. Prior television receivers have not been well suited for adjusting the video bandwidth according to the strength of the signals being received, and in particular they have not been adapted to correlate the contrast control with the control of bandwidth.

Satisfactory wide-band amplification of strong signals has been particularly difficult to achieve heretofore in television receivers of the intercarrier sound type. In this type of receiver the video intermediate-frequency carrier and the sound intermediate-frequency carrier are detected in a single detector, producing a combination video and intermediate-frequency sound signal in which the new sound intermediate frequency is a beat between the first-mentioned intermediate frequencies. The video and audio components of this combined signal are filtered out and separately reproduced after passing through the video amplifier. When attempts are made to increase the video bandwidth in receivers of prior design, undesirable cross-modulation effects are prone to occur on strong signals, giving rise to a form of disturbance known as "sync buzz." This consists of an audible buzzing noise in the sound, very objectionable to a listener, which occurs at the 60-cycle field repetition rate of the video signal or a harmonic thereof. The presence of sync buzz in the sound indicates that the plate voltage of the video amplifier is being swung beyond cut-off, thereby interrupting the intermediate-frequency sound signal periodically.

An object of this invention is to provide an improved video amplifier in which the contrast control varies both the gain and the bandwidth of the amplifier, producing a wide band for strong signals and a narrower band for weak signals.

Another object is to provide an improved video amplifier for an intercarrier sound receiver which has exceptionally wide-band amplification when strong signals are being received, and which does not produce sync buzz or like distortions of the sound.

A further object is to provide a novel and inexpensive contrast control for a video amplifier which concurrently adjusts the gain and bandwidth of the amplifier and which does not cause the amplifier to overload on strong signals.

A feature of the invention is the provision of a contrast control for a video amplifier comprising a variable resistor arranged in the cathode circuit of the amplifier to afford a variable amount of negative feedback, together with a capacitive high-frequency compensating means associated with the variable resistor to modify the negative feedback at the higher frequencies.

Another feature is the provision of a graduated resistance-capacitance network in the contrast control whereby the high-frequency compensation is varied as the resistance of the contrast control is varied, causing the bandwidth to be adjusted in accordance with the strength of the signal that is being received.

The foregoing and other objects, features and advantages of the invention will be understood better from the following detailed description thereof taken in connection with the accompanying drawing, wherein.

In practicing the invention, the video amplifier of an intercarrier sound television receiver is provided with a contrast control which varies both the gain and the bandwidth of this amplifier. The band is widened for strong signals to obtain the maximum picture detail, and for weak signals the bandwidth is reduced to minimize interference. This contrast control includes a variable resistor, preferably of the potentiometer type, which is connected at one end thereof to the cathode of the amplifier tube and at the other end thereof to the B— terminal of the power supply. The combined video and intermediate-frequency sound signal furnished by the second detector is appplied between the control grid of the amplifier tube and the movable contact of the potentiometer. For strong signals, the contrast control is set in a low-gain position wherein the grid is biased by the voltage drop over a large portion of the cathode resistor. Insofar as the lower-frequency components of the video signal are concerned, this produces a large amount of negative or degenerative feedback, which tends to widen the video band without introducing any undesirable "sync buzz" or other cross-modulation effects into the sound signal. To insure good high-frequency response and consequent improvement of band-width, the potentiometer resistance is shunted by a series of capacitors, with each capacitar shunting a section of the potentiometer resistance. The relative magnitudes of the capacitors and the potentiometer resistance sections are such that at certain signal levels, optimum amounts of high-frequency compensation are obtained so that the amplification of the high-frequency components does not fall off relative to that of the lower-frequency components of this signal. This sectionalized compensation network prevents over-compepnsation of very strong signals while providing optimum high-frequency compensation at certain lower signal levels, with satisfactory compensation at intermediate levels. Little or no compensation is effected at low signal levels, since a wide band is not desired there.

Figure 1:
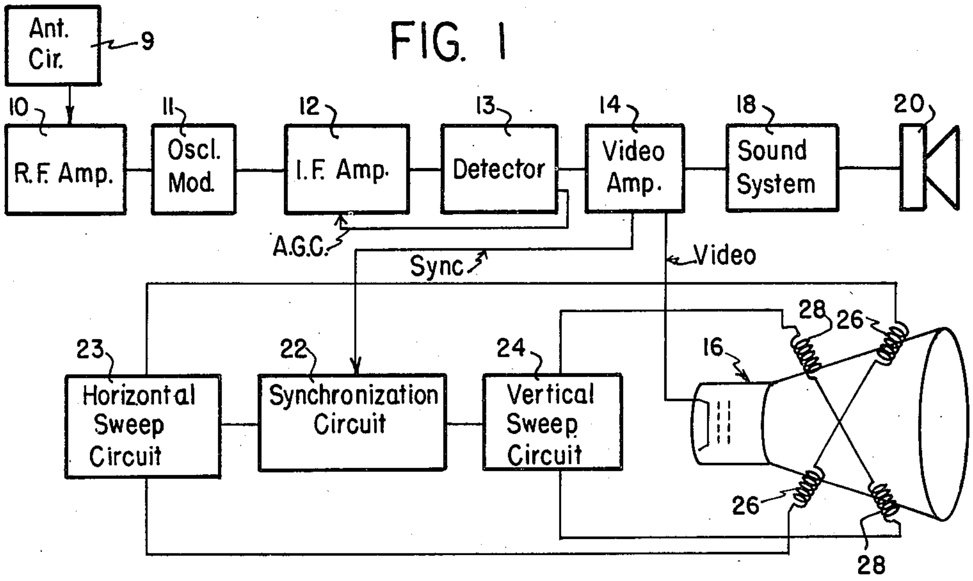
Fig. 1 is a block diagram of a television receiver in which the invention may be utilized.

Fig. 1 illustrates a typical television receiver in which the present invention may be utilized, with the lettered blocks indicating the manner in which a television signal is received. After being picked up by the antenna circuit 9, the incoming television carrier signal is amplified in the radio-frequency amplifier 10 and is fed to the oscillator-modulator stage 11, where it is converted to an equivalent intermediate-frequency signal. This intermediate-frequency signal is amplified by an amplifier 12 and is detected by a second detector 13, producing a combined video and intermediate-frequency sound signal in which the intermediate-frequency sound signal is a 4.5 megacycle beat between the video intermediate-frequency carrier and the sound intermediate-frequency carrier furnished by the oscillator-modulator 12. This combined signal is fed to the video amplifier 14, with which the present invention is particularly concerned. The video and sound components of the amplified signal then are separated in a well known manner, with the video signals being applied to the picture tube 16 while the sound signals pass through the sound system 18 to the loudspeaker 20.

The video amplifier 14 also controls a synchronization circuit 22, which in turn controls a horizontal sweep circuit 23 and a vertical sweep circuit 24. The output of the horizontal sweep crcuit 23 is fed to the horizontal deflecting means, represented by the deflection coils 26, of the picture tube 16. The output of the vertical sweep circuit 24 is fed to the vertical deflecting means, represented by the deflection coils 28 of the picture tube 16. Although the illustrated picture tube 16 is of the electromagnetic type, it may equally well be of the electrostatic type, within the scope of the present invention.

Figure 2:
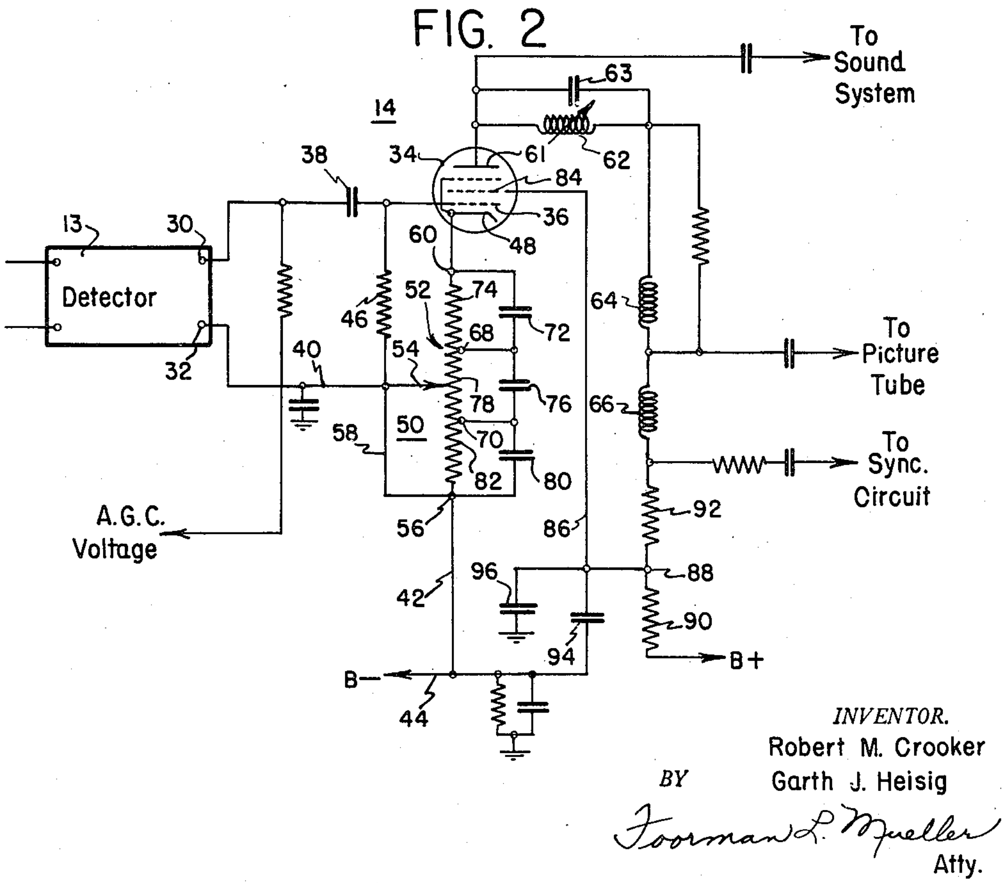
Fig. 2 is a schematic illustration of an improved video amplifier which embodies the principles of the invention.

Referring now to Fig. 2, the output terminals 30 and 32 of the second detector 13 are coupled to the video amplifier 14 as shown. Automatic gain control (AGC) in the present receiver is independent of the contrast control. The AGC voltage is taken off at the output side of the detector 13, as indicated in Fig. 2, and is applied to the IF amplifier 12, Fig. 1, for stabilizing the IF signal level. Fluctuations in the strength of the incoming carrier signal are offset by the action of the AGC circuit to prevent undesirable variations of the sound and picture intensity.

The video amplifier 14 includes a pentode 34 having a control grid 36 that is coupled through the blocking capacitor 38 to the output terminal 30 on the low-potential side of the detector 13. The output terminal 32 on the high-potential side of the detector 13 is connected by a conductor 40 to the movable contact 54 of a potentiometer 50, which constitutes the contrast control of the video amplifier 14. The movable contact 54 (in the present embodiment of the invention) is connected by a conductor 58 to a terminal 56 of the potentiometer 50, which terminal is connected by a conductor 42 to a conductor 44 which leads to the negative or B— terminal of the receiver power supply (not shown). A coupling resistor 46 extends between the control grid 36 and the movable contact 54 to develop the input signal voltage. The potentiometer 50 has a resistance winding 52 with which the movable contact 54 cooperates. One end of this resistance winding 52 is connected to the terminal 56 on the B— side of the potentiometer 50. The other end of the winding 52 is connected to a terminal 60, to which the cathode 48 of the amplifier tube 34 is connected.

The plate 61 of the amplifier tube 34 is coupled to an audio load consisting of the sound system 18 (Fig. 1) and a video load comprising the picture tube 16 and the synchronization circuit 22. The picture tube 16 and synchronization circuit 22 are coupled to the plate 61 through impedance couplings which include the peaking coils 64 and 66 and a variable inductor 62. The inductor 62, in conjunction with a capacitor 63, serves as a 4.5-megacycle trap to prevent the IF sound signal from passing to the video load. The peaking coils 64 and 66 furnish a certain amount of high-frequency compensation to prevent the frequency-response characteristic of the amplifier 14 from falling off too rapidly at the high-frequency end of the band, due mainly to the distributed capacitance of the system paralleling the resistors 90 and 92 in the plate circuit. The peaking coils, however, do not provide the desired high-frequency compensation at all signal levels.

In accordance with the present invention, an adjustable high-frequency compensation means is incorporated in the contrast control 50. As seen in Fig. 2, the resistance winding 52 is tapped at points 68 and 70. A capacitor 72 is connected between the terminal 60 and the tap 68 in shunt with the section 74 of the resistance winding 52 intermediate these two points. Similarly, a capacitor 76 is connected between the taps 68 and 70 in shunt with the section 78 of the resistance winding 52 intermediate these points. A third capacitor 80 is connected between the tap 70 and the terminal 56 in shunt with the section 82 of the resistance winding 52 between these points. Hence, as the movable contact 54 of the contrast control 50 is shifted relative to the resistance winding 52, thereby varying the gain of the amplifier 14, the amount of capacitance in shunt with the effective portion of the resistor 52 likewise is varied. The manner in which this affects the performance of the video amplifier 14 will be discussed presently.

The screen grid 84 of the amplifier tube 34 is connected by a conductor 86 to a point 88 in the plate voltage supply circuit for the tube 34, which point is at the junction of the voltage dividing resistors 90 and 92. Capacitors 94 and 96 bypass the screen grid dropping resistor 90.

The setting of the contrast control 50 determines the gain and the amount of negative feedback in the video amplifier 14. When a strong signal is being received, the control 50 is set for relatively low gain (that is, low contrast), because the intensity of the signal is such as to provide the required contrast without high gain in the video amplifier. Under these conditions the movable contact 54 of the potentiometer 50 is positioned toward the end of the resistance winding 52 that is connected to the terminal 56. This inserts a great deal of negative feedback resistance between the cathode 48 and the grid 36 of the amplifier tube 34. With a large negative feedback, the amplifier 14 has low gain, and there is also a slight widening of the video band due to this feedback action. Further widening of the viedo band is accomplished by the action of the compensating capacitors 72, 76 and 80, as will be explained presently. For weak signals, the contrast control is set for high gain (that is, high contrast) by moving the contact 54 toward the end of the resistance winding 52 that is connected to the terminal 60. Under these conditions the negative feedback is greatly reduced and the video band tends to be more narrow.

The capacitors 72, 76 and 80, in conjunction with the variable resistor or potentiometer 50, affect the bandwidth of the video amplifier 14 by improving the high-frequency response of the video amplifier. As mentioned hereinabove, the frequency-response characteristic of the amplifier 14 tends to fall off at the higher frequencies due principally to the distributed capacitance of the system in parallel with the plate circuit of the tube 34. This high-frequency drop-off can be reduced by decreasing the resistances of the plate resistors 90 and 92, but this is not a desirable expedient since it results in an over-all loss of gain and an increase in the amount of sync buzz produced by strong signals. The resistors 90 and 92, therefore, are made fairly large (4700 and 6800 ohms, respectively), and the peaking coils 64 and 66 are employed to partially offset the effect of the shunting capacitance, thus extending the frequency-response range somewhat at the higher frequencies. The balance of the high-frequency compensation is afforded by the capacitors 72, 76 and 80.

Figure 3:
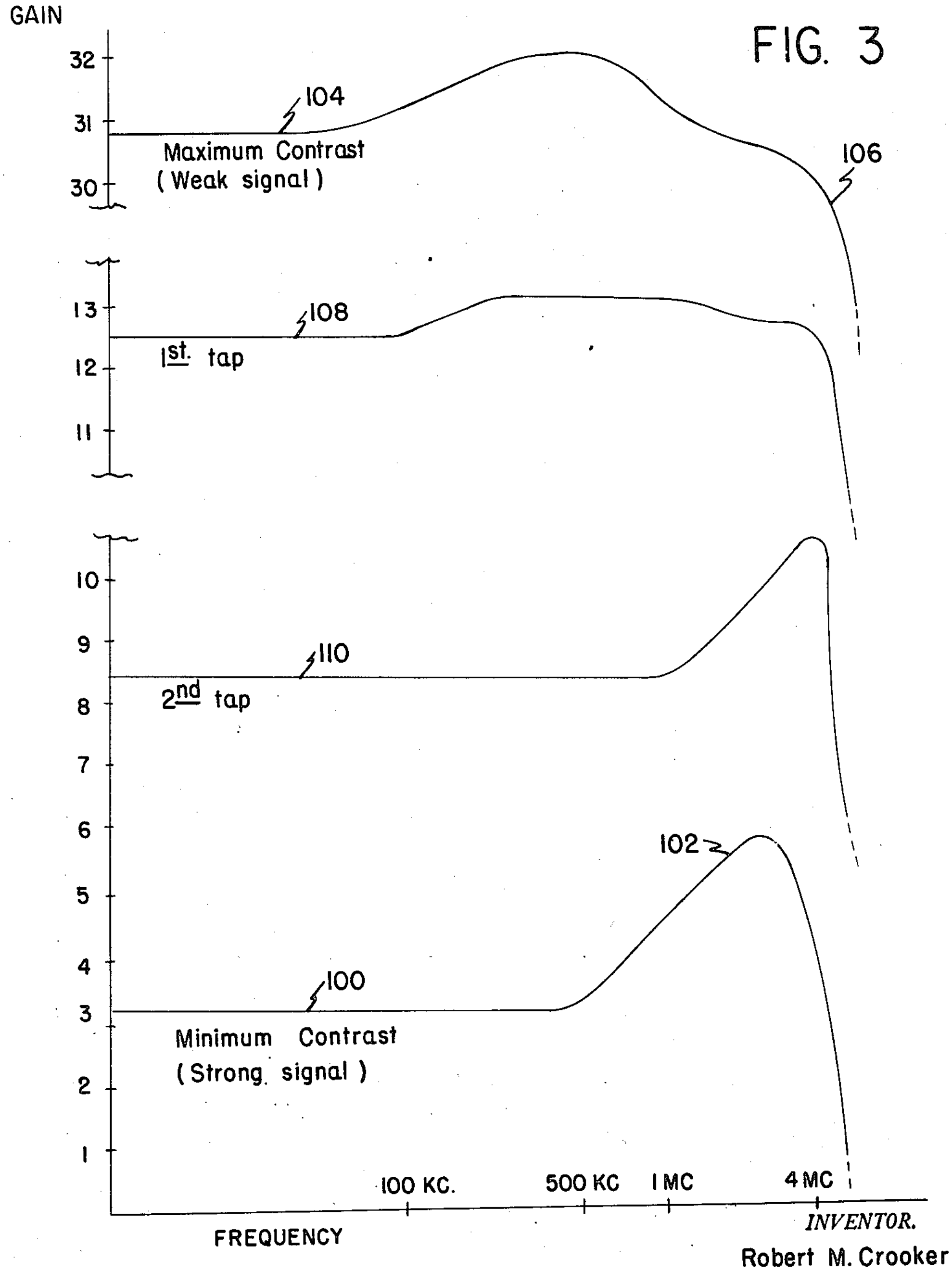
Fig. 3 is a graphic representation of the video amplifier frequency-response characteristics under various conditions of operation.

Referring to Figs. 2 and 3, when a strong signal is being received, the movable tap 54 of the contrast control potentiometer 50 is positioned toward the lower end of the resistance winding 52 for low gain. For a signal of maximum strength, that is, one requiring minimum contrast, the tap 54 is positioned at the terminal 56, producing a frequency-response characteristic of the video amplifier 14 as indicated by the curve 100 in Fig. 3. This affords maximum bandwidth due to the strong high-frequency compensating action of the capacitors 72, 76 and 80 and also due in some measure to the large amount of negative feedback which takes place. As a result of the compensating action, the characteristic 100 has a large peak 102 at the high-frequency end thereof. The widening of the video band and the accentuation of the high-frequency components in the signal combine to produce a picture in which all of the fine details are brought out sharply and clearly. The design of the high-frequency compensating network is such that excessive compensation is avoided. By "excessive compensation" is meant such high amplification of the high-frequency signal components as would give rise to strong overshoots of the video signal extending into the sync pulse level, causing poor synchronization.

When an extremely weak signal is being received, the contrast control 50 is set for maximum gain, that is, maximum contrast. This is done by moving the tap 54 up to the terminal 60, thereby short-circuiting all of the resistance winding 52 and the capacitors 72, 76 and 80. The frequency-response characteristic of the video amplifier 14 under these circumstances is indicated by the curve 104 in Fig. 3. The curve 104 drops off rapidly at the high-frequency end thereof, as indicated at 106. Hence, the video band is relatively narrow when the contrast control 50 is adjusted for the reception of weak signals. In receiving weak signals a narrow band is preferred because it eliminates a great deal of the noise that would otherwise be amplified. Such interference would obscure the picture to a great degree if wide-band amplification were employed with high gain.

Optimum, or at least satisfactory, high-frequency compensation is obtained at each of the intermediate levels between the two extremities described above. Thus, when the contact 54 of the potentiometer 50 is at the tap 68, the frequency-response characteristic has a configuration such as that represented by the curve 108 in Fig. 3. The high-frequency drop-off is modified here because of the greater amount of negative feedback and the compensating action of the capacitor 72. When the movable contact 54 is at the tap 70, the frequency-response characteristic is represented by the curve 110 in Fig. 3. Here, the video band is quite wide, and there is a slight peak at the high-frequency end of the characteristic due to the action of the capacitors 72 and 76.

Typical values which may be selected for the various resistors and capacitors in the contrast control network 50 are given below. It should be understood that the scope of the invention is not limited to these particular values, nor is it necessarily limited to the same number of sections or graduated steps in the control network.

Resistor 74—250 ohms
Resistor 78—250 ohms
Resistor 82—1500 ohms
Capacitor 72—1000 micromicrofarads
Capacitor 76—750 micromicrofarads
Capacitor 80—250 micromicrofarads The contrast control 50, while simple and inexpensive, greatly improves the value of the receiver because of the better picture quality and distortionless sound which are obtained when this contrast control is used. Full advantage is taken of strong signals coming from nearby transmitting stations, in that the video bandwith is made extremely wide to bring out all the fine details of the picture, and this is done without disturbing the proper synchronization of the picture signal and without producing any "sync buzz" or like distortion in the sound. For weak signals, on the other hand, the bandwith automatically is reduced as the picture contrast is raised, so that interference will be held to a minimum. Other advantages of the disclosed invention, not specifically mentioned above, may occur to those skilled in the art.

While there has been described what is at present considered to be the preferred embodiment of the invention, it will be understood that various modifications thereof may be made within the true spirit and scope of the invention as defined in the appended claims.

We claim:

1. In a television receiver having a plate voltage supply source with positive and negative terminals, a video amplifier comprising an amplifier tube with a plate, a cathode and a grid, video load means connecting said plate to the positive terminal of the voltage supply source, a contrast control including resistance means having one end thereof connected to said cathode and the other end thereof connected to the negative terminal of the voltage supply source, a movable contact in said contrast control cooperating with said resistance means, signal input means having one terminal thereof coupled to said grid and another terminal thereof coupled to said movable contact, said resistance means including a plurality of series-connected sections, and a plurality of capacitance means individually coupled across said resistance sections to improve the response of the video amplifier to high-frequency components of the video signal while having substantially no effect upon the response of the amplifier to lower-frequency components, whereby movement of said movable contact varies the amount of negative feedback produced by said resistance means and the frequency characteristics thereof to control both the gain and the effective bandwidth of the video amplifier.

2. In a television receiver having a plate voltage supply source with positive and negative terminals, a video amplifier comprising an amplifier tube with a plate, a cathode and a grid, video load means connecting said plate to the positive terminal of the voltage supply source, a contrast control including resistance means having one end thereof connected to said cathode and the other end thereof connected to the negative terminal of the voltage supply source, a movable contact in said contrast control cooperating with said resistance means, signal input means having one terminal thereof coupled to said grid and another terminal thereof coupled to said movable contact, said resistance means including a plurality of series-connected sections, and a plurality of circuits including capacitors individually shunting said sections, with the relative magnitudes of the resistance and capacitance across each section being such as to improve the high-frequency response of the amplifier to a greater extent for low-gain settings of said contrast control than for high-gain settings thereof, whereby movement of said movable contact varies both the magnitude and the frequency response of the negative feedback produced by said resistance means to thereby control the gain and the effective bandwith of the video amplifier.

3. In a television receiver having a plate voltage supply source with positive and negative terminals thereof, a video amplifier comprising an amplifier tube with a plate, a cathode and a grid, video load means connecting said plate to the positive terminal of the voltage supply source, a contrast control including a resistance winding having one end thereof connected to said cathode and the other end thereof connected to the negative terminal of the voltage supply source, movable contact means arranged to shunt a variable portion of said resistance winding, thereby to vary the gain of the amplifier, signal input means having one terminal thereof coupled to said grid and another terminal thereof connected to the negative terminal of the voltage supply source, said resistance winding being divided into a plurality of series-connected sections, and a plurality of capacitors respectively shunting said winding sections to afford a graduated high-frequency compensation whereby the high-frequency response of said amplifier varies with the gain thereof.

4. In a television receiver of the intercarrier sound type having a plate voltage supply source with positive and negative terminals, a video amplifier comprising an amplifier tube with a plate, a cathode and a grid, output load means coupling said plate to the positive terminal of the voltage supply source, said load means including a video load portion and a sound load portion, a contrast control including a resistance winding having one end thereof connected to said cathode and the other end thereof connected to the negative terminal of the voltage supply source, a movable contact cooperating with said resistance winding, signal input means having one terminal thereof coupled to said grid and the other terminal thereof coupled to said movable contact, whereby said contrast control affords a variable amount of negative feedback to vary the gain of the amplifier, and high-frequency compensating means including a plurality of series-connected capacitors, each of said capacitors being shunted across a portion of said resistance winding, with the relative magnitudes of said capacitors and said winding portions being such as to graduate the high-frequency response of said amplifier according to the setting of said contrast control, thereby causing the video bandwidth of said amplifier to be relatively large when the gain is small and relatively small when the gain is large.

5. In a television receiver having a voltage supply source with positive and negative terminals, an amplifier comprising an amplifier tube with a plate, a cathode and a grid, plate load means connecting said plate to said positive terminal, a gain control including a resistance element having one end thereof connected to said cathode and the other end thereof connected to said negative terminal, a movable contact in said gain control cooperating with said resistance element, signal input means having one terminal thereof coupled to said grid and another terminal thereof coupled to said movable contact, shunt means connecting said movable contact to said negative terminal, said resistance element having a plurality of series-connected resistance sections, and individual capacitive circuit means respectively connected across said resistance sections to improve the response of the amplifier to high-frequency components of the signal amplified therein, said capacitors having such value that the ratio of capacity to resistance of the sections of said resistance element adjacent said cathode is greater than the ratio of capacity to resistance of the sections adjacent said negative terminal so that the bandwith of said amplifier varies inversely with the gain thereof.

ROBERT M. CROOKER.
GARTH J. HEISIG.

REFERENCES CITED

The following references are of record in the file of this patent:

UNITED STATES PATENTS

| Number | Name | Date |
|---|---|---|
| 2,022,972 | Nebel | Dec. 3, 1935 |
| 2,233,759 | Werrmann | Mar. 4, 1941 |
| 2,273,143 | Roberts | Feb. 17, 1942 |
| 2,448,908 | Parker | Sept. 7, 1948 |
| 2,504,175 | Bradley | Apr. 18, 1950 |
| 2,504,662 | Dome | Apr. 18, 1950 |